Oct. 5, 1948.   L. LEE, 2D   2,450,834
CONTROL APPARATUS FOR INTERNAL-COMBUSTION ENGINES
Original Filed Nov. 9, 1944   3 Sheets-Sheet 2

INVENTOR.
*Leighton Lee II*
BY
*Lester W. Clark*
AGENT

Oct. 5, 1948.　　　　　　L. LEE, 2D　　　　　2,450,834
CONTROL APPARATUS FOR INTERNAL-COMBUSTION ENGINES
Original Filed Nov. 9, 1944　　　　　　　3 Sheets-Sheet 3
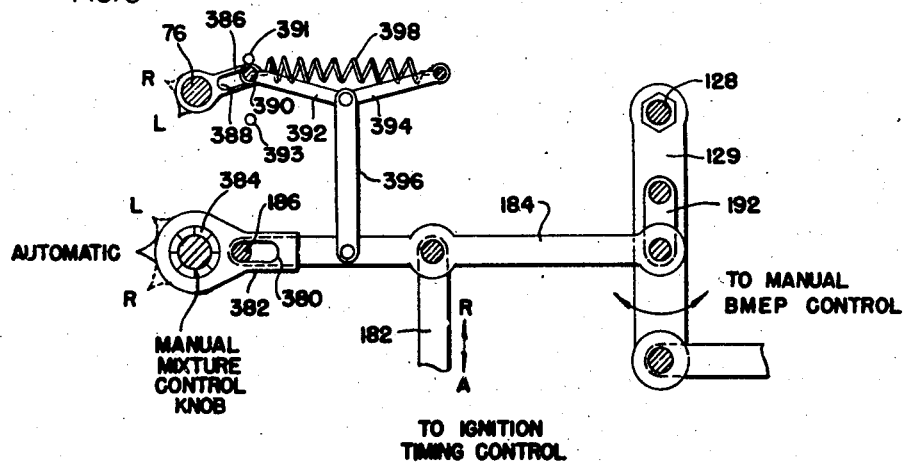
INVENTOR.
LEIGHTON LEE II
BY
Lester W Clark
AGENT Patented Oct. 5, 1948

2,450,834

UNITED STATES PATENT OFFICE 2,450,834

CONTROL APPARATUS FOR INTERNAL-COMBUSTION ENGINES

Leighton Lee, II, West Hartford, Conn., assignor, by mesne assignments, to Niles-Bement-Pond Company, West Hartford, Conn., a corporation of New Jersey Original application November 9, 1944, Serial No. 562,715. Divided and this application December 6, 1945, Serial No. 633,168

4 Claims. (Cl. 123—117)

The present invention relates to apparatus for controlling internal combustion engines, in particular, to apparatus controlling supplies of fuel and air to such an engine and for controlling the ignition timing on such an engine.

In my co-pending application, Serial No. 562,715, filed November 9, 1944, now Patent No. 2,443,419, of which the present application is a division, I have provided a system which responds to brake mean effective pressure, and controls the throttle of an internal combustion engine in order to maintain a substantially constant brake mean effective pressure.

An object of the present invention is to provide means for coordinating the ignition timing of an internal combustion engine with the brake mean effective pressure of that engine.

Figure 1:
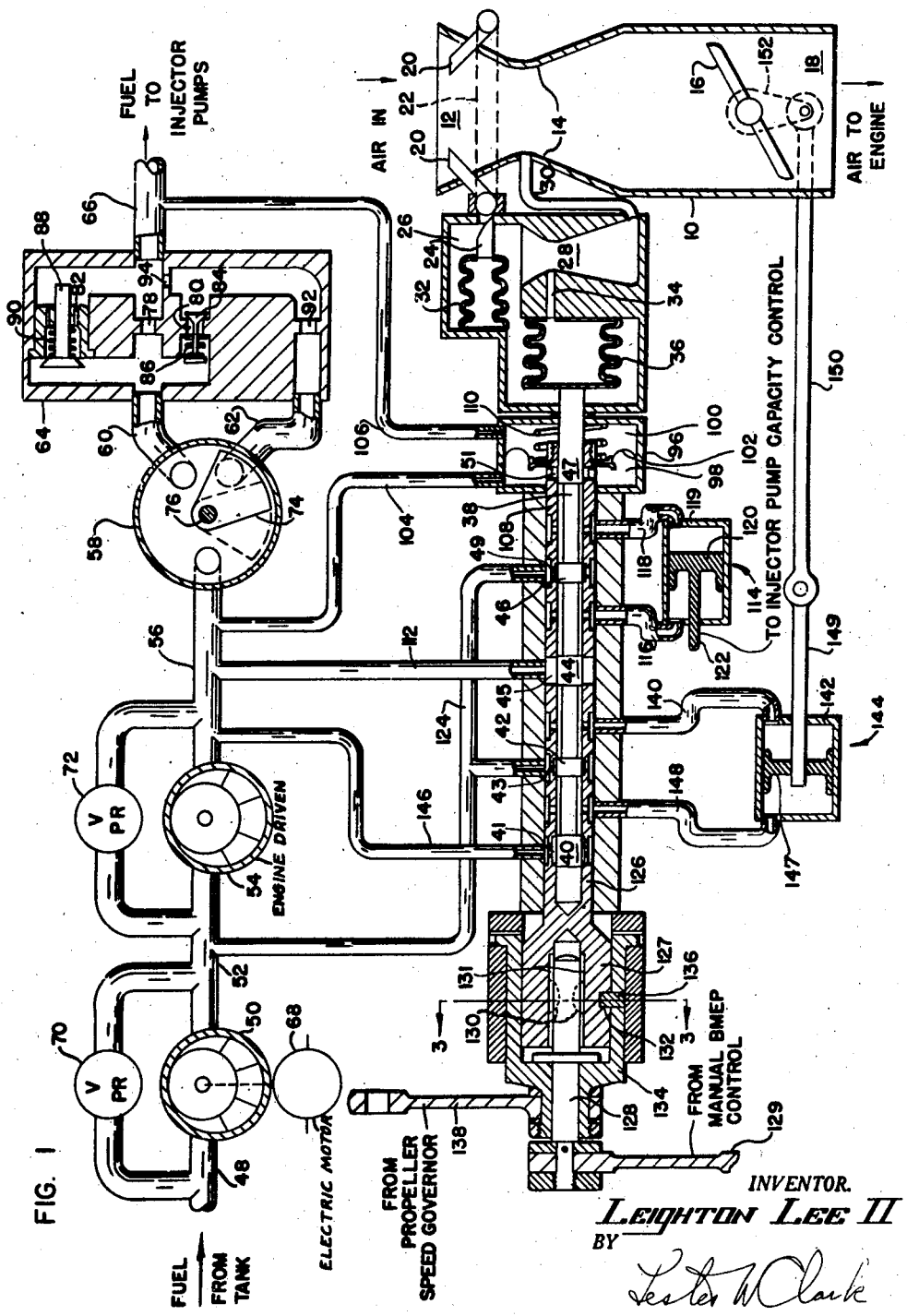
Figure 2:
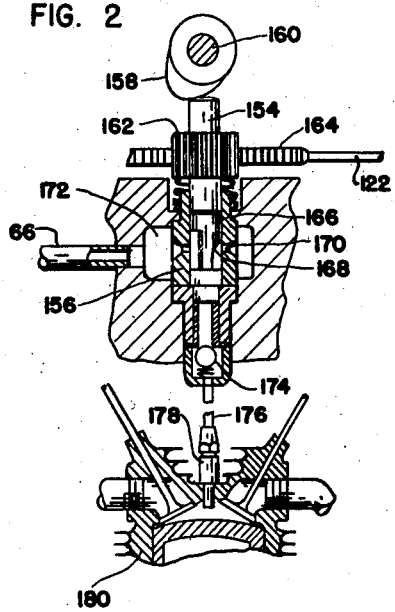
Figure 3:
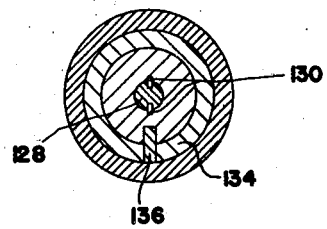
Figure 4:
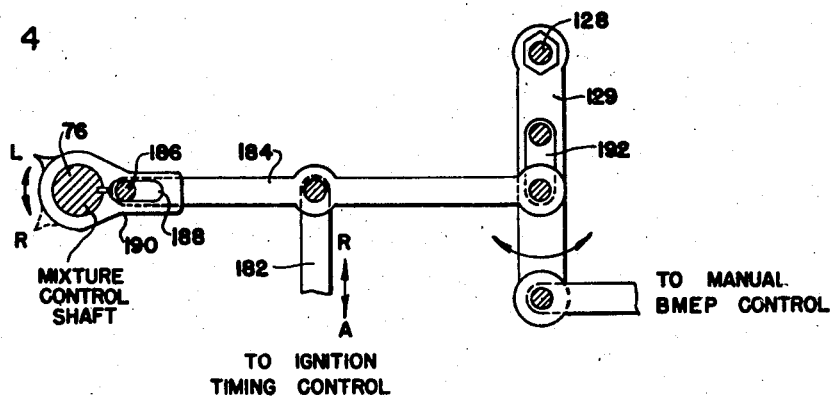

Other objects and advantages of the present invention will become apparent from a consideration of the appended specification, claims and drawing, in which Figure 1 illustrates, somewhat diagrammatically, apparatus for controlling the supply of fuel and combustion air to an internal combustion engine in accordance with the principles of my invention, Figure 2 is a cross-sectional view of the fuel injection pump which may be controlled by the apparatus of Figure 1, Figure 3 is a cross-sectional view taken along the line 3—3 of Figure 1, looking in the direction of the arrows, Figure 4 illustrates a linkage for connecting the B. M. E. P. control and the mixture control of Figure 1 to an ignition timing control device, and Figure 5 illustrates a modified form of interlocking linkage which may be used in place of that shown in Figure 4.

FIGURE 1

There is shown at 10 an air induction conduit having an entrance 12, a Venturi restriction 14, a throttle 16, and an outlet 18.

A portion of the air entering the conduit 10 flows thru a plurality of impact tubes 20, whose ends are open to receive the impact of the flowing air. From the impact tubes, this air flows thru a passage 22 interconnecting the impact tubes, and thence past a valve 24 into a chamber 26. From the chamber 26 the air flows thru a boost Venturi 28 and thence thru a conduit 30 to the throat of Venturi 14.

The pressure differential set up by air flowing thru the main Venturi 14 produces a flow of air thru the passage just traced, which includes the boost Venturi 28. The valve 26 is positioned by a sealed bellows 32. This bellows 32 preferably contains a temperature responsive fluid, so that the position of valve 24 is determined by both the pressure and the temperature of the air in chamber 26. By the operation of valve 26, the air pressure differential set up between the entrance and throat of the boost Venturi 28 is corrected to produce a true measure of the mass of air flowing per unit time thru the conduit 10. The action of the bellows 32 and valve 24 as a pressure and temperature compensator is more fully described and claimed in the co-pending application of Harold F. Twyman, Serial No. 486,599, filed May 11, 1943, now Patent No. 2,391,755.

The pressure at the throat of boost Venturi 28 is communicated thru a passage 34 to the interior of a flexible bellows 36. The bellows 36 is located in an extension of chamber 26, so that its exterior is exposed to the pressure at the entrance to the boost Venturi 28. The free end of bellows 36 is therefore positioned in accordance with the pressure differential set up in the boost Venturi 28, and its position is consequently a measure of the mass of air flowing thru the air induction passage 10, per unit time.

The free end of bellows 36 is attached to and positions an elongated spool valve 38 having five lands, 40, 42, 44, 46 and 47, cooperating with ports 41, 43, 45, 49, and 51, respectively.

Fuel for the engine comes from a tank or other source not shown and passes thru a conduit 48, a pump 50 of the rotary sliding vane type, a conduit 52, another rotary pump 54, a conduit 56, a mixture control unit 58, conduits 60 and 62, a jet system 64, and a conduit 66 to a set of fuel injection pumps for the cylinders of the engine. A common form of fuel injection pump is illustrated in Figure 2.

The pump 50 is driven by an electric motor schematically indicated at 68. The pressure at the outlet of pump 50 is regulated by a pressure relief valve shown diagrammatically at 70. The pump 54 is preferably driven by the engine. The outlet pressure of the pump 54 is likewise controlled by a pressure relief valve schematically indicated at 72. The relief valves 70 and 71 may be of the type shown in the patent to Storch et al. No. 2,157,089, in which a by-pass valve is provided to allow fuel to pass thru the valve toward the engine when its associated pump is not functioning.

The mixture control unit 58 includes a disc valve 74 attached to a shaft 76. When the valve 74 is in the position shown in full lines in the drawing, fuel may flow from the mixture control unit to the jet system only thru the conduit 60. When the disc valve 74 is in the dotted line position shown in the drawing, fuel can flow from the mixture control unit to the jet system thru both the conduits 60 and 62. The full line position of the mixture control is known as the "lean" position, while the dotted line position is known as the "rich" position. The valve 74 may also be moved to a position wherein both the conduits 60 and 62 are closed, which is known as the "cut-off" position.

Fuel entering the jet system 64 thru the conduit 60 may pass thru either of three jets or restrictions 78, 80 and 82 in the jet system. The restriction 78 is of fixed cross-sectional area. The opening thru the jet 80 is controlled by a valve 84, hereinafter termed an "enrichment valve." The valve 84 is biased to closed position by a spring 86 and is movable in an opening direction by the fuel pressure differential across the jet system whenever that pressure differential exceeds a value determined by the characteristics of spring 86 and the area of the valve seat.

The opening thru jet 82 is controlled by a valve 88 biased to open position by a spring 90. The valve 88 is moved toward closed position by the fuel pressure differential when the latter exceeds a value determined by the characteristics of spring 90. The restriction 82 is open only at low fuel pressure differentials, and is known as the "idle jet."

Fuel entering the jet system thru conduit 62 flows thru a fixed restriction 92. Fuel passing thru the restrictions 80 and 92 also passes thru a limiting restriction 94 before leaving the jet system thru the conduit 66.

For a given fixed cross-sectional area of the path open to the flow of fuel thru the jet system 64, the fuel pressure differential across that system is a measure of the flow of fuel.

The valve 38 passes thru the center of a casing 96 which is divided into two expansible chambers 98 and 100 by a flexible diaphragm 102. The fuel pressure in the conduit 56 upstream from the jet system 64 is communicated to the chamber 98 thru a conduit 104. The fuel pressure in the conduit 66 downstream from the jet system 64 is communicated to the chamber 100 thru a conduit 106. The diaphragm 102 is attached at its center to an elongated cylindrical seat member 108, thru which ports 49 and 51 extend radially. A spring 110 biases the diaphragm 102 and the seat member 108 to the left, as viewed in the drawing.

The valve 38 and seat member 108 cooperate to control the flow of fuel from conduit 56 either thru conduit 104, port 51 and a conduit 118 to the right end of a cylinder 119 in a piston type fluid motor generally indicated at 114, or thru a conduit 112, port 45 and a conduit 116 to the left end of the cylinder 119 in the fluid motor 114.

The piston 120 of fluid motor 114 is connected by a rod 122 to a mechanism for controlling the capacity of the injector pumps, which may be the rack 164 illustrated in Figure 2.

The operation of valve 38 and seat 108 is such that when fuel is supplied to one end of the cylinder 119, fuel is drained from the opposite end at the same time thru a conduit 124 to the conduit 52 on the inlet side of pump 54.

The ports 41 and 43 extend radially thru another elongated cylindrical seat member 126. The port 45 is formed by the space between the adjacent ends of seat members 108 and 126. The left end of the seat member 126 is enlarged and is provided with an internal bore extending inwardly from its left end. A shaft 128 extends into this bore. The shaft 128 is connected to the seat member 126 by a pair of Woodruff keys 130, which slide in keyways 131 in the seat member so that seat member 126 rotates with shaft 128 but is movable longitudinally with respect to it.

The outer surface of the enlarged left end 127 of seat member 126 is provided with a helical groove 132. The end 127 is surrounded by a cup 134 which carries a pin 136 extending into the helical groove 132. The cup 134 is rotatable by means of an arm 138 connected to the propeller speed governing mechanism, so that the angular position of cup 134 is a measure of the engine speed.

It may be seen that upon rotation of arm 138, the pin 136, riding in the groove 132, causes a longitudinal movement of seat member 126. The construction is such that movement of arm 138 in a direction indicative of increasing speed causes a movement of seat member 126 to the right. It may also be seen that a rotation of shaft 128 by means of manual control lever 129, while the arm 138 is held stationary, will likewise cause a longitudinal movement of seat member 126 by the cooperation of pin 136 and groove 132. The device is so constructed that a movement of lever 129 in a direction indicative of increased brake mean effective pressure causes a movement of seat member 126 to the right.

The seat member 126 cooperates with lands 40, 42 and 44 on the valve 38 to control the flow of fuel from conduit 56 either thru conduit 112 and a conduit 140 to the right end of a cylinder 142 in a fluid motor 144 or thru conduits 146 and 148 to the left end of cylinder 142. The fluid motor 144 has a piston 146 which is connected thru a rod 148 and a link 150 to an arm 152 attached to the shaft of throttle 16.

FIGURE 2

There is illustrated in Figure 2 a common form of injection pump used with internal combustion engines. The pump illustrated is for a single cylinder, and a set of such pumps is usually provided, corresponding in number to the number of cylinders in the engine. The pump includes a plunger 154 which is reciprocated in a cylinder 156 by means of a cam 158 acting on the upper end of the plunger. The cam 158 is fixed on a shaft 160 which is rotated by the engine. A pinion gear 162 is attached to the plunger 154 near its upper end, above the cylinder 156. The pinion gear 162 cooperates with a rack 164 operated by the piston rod 122 of Figure 1. The lateral surface of the pump plunger is cut away, as indicated at 166. One end of the cut-away portion is provided with a generally helical contour, shown at 168. The cut-away portion 166 of the plunger 154 cooperates with ports 170 which extend thru the cylinder 156 to a chamber 172 in communication with the fuel conduit 66.

When the ports 170 are completely covered by the raised portions of the lateral surface of plunger 154, a pressure is created on the fuel below the piston, and the pump discharges thru a check valve 174 and a conduit 176 to an injector nozzle 178 located in one of the cylinders 180 of the engine. As soon as the cut-away portion 166 uncovers one of the ports 170, the pressure ahead of the pump plunger is relieved, and pumping ceases. It may, therefore, be seen that by virtue of the helical contour 168, the effective length of the pumping stroke may be varied by rotation of the plunger 154, which is accomplished by movement of rack 164.

Operation of Figures 1 and 2

By manipulation of the manual control lever 129, the operator of the engine may set the value of brake mean effective pressure which he wishes to maintain. Under normal conditions, this pressure would be selected at the value which corresponds to the highest efficiency. The arm 138 is connected to the propeller speed governor so that its position is a measure of the engine speed. The manual lever 129 and the arm 138 cooperate, as previously explained, to set the position of seat member 126 at a position which is a measure of the air flow necessary to give the desired B. M. E. P. at the particular speed existing. If the rate of air flow actually existing is then the correct value, the relative positions of the valve 38 and the seat member 126 are such that the lands 40, 42 and 44 on the valve 38 close their associated ports and the throttle remains in its previous position. If, however, the rate of flow of air is too low, then the position of valve 38, which is a measure of the existing air flow, is displaced to the left, with respect to seat member 126, from the position shown in the drawing. The port 41 associated with the land 40 is now opened to permit the flow of fuel under high pressure from conduit 146 to conduit 148 and the left end of cylinder 142 in fluid motor 144. At the same time, the port associated with the land 42 is opened to permit the draining of fuel from the right end of cylinder 142 thru conduits 140 and 124 to the inlet side of pump 54. The pressure differential thereby applied to piston 146 causes it to move to the right, opening the throttle 16. The opening movement of the throttle causes an increase in the air flow and a contraction of bellows 36, moving valve 38 to the right. This increase in air flow and movement of valve 38 continues until the lands 40, 42 and 44 close their respective ports.

It will be readily understood that if the air flow is too high for the selected B. M. E. P. and the existing engine speed, the bellows 36 displaces the valve 38 to the right with respect to the seat member 126 and the fluid motor 144 then responds to close the throttle 16 until the air flow is reduced to the proper value.

The fluid motor 114, which operates the rack 164 or the injector pumps, is controlled by the relative positions of valve 38 and seat member 108. The fluid motor 114 operates the injector pump racks to control the injector pump capacity so as to balance the fuel flow against the air flow, and maintain the fuel-to-air ratio at the desired value. The pressure drop across the jet system 64 is applied to the diaphragm 102 to position the seat member 108. The pressure differential across the jet system is therefore balanced against the rate of air flow. This fuel pressure differential is a true measure of the fuel flow only for a constant open cross-sectional area of the fuel flow path thru the jet system. The apparatus described therefore produces a substantially constant fuel-to-air ratio only so long as the cross-sectional area of the jet system open to the flow of fuel is not varied. Means have been provided to vary this cross-sectional area automatically under certain conditions or to vary it manually in order to control the fuel-to-air ratio.

Two devices are provided for automatically varying the open cross-sectional area of the fuel flow path thru the jet system. One of these is the idle jet valve 88 and the other is the enrichment valve 84. The idle valve 88 opens whenever the fuel pressure differential is below a predetermined small value corresponding to a low rate of air flow, so as to enrich the fuel-to-air ratio under idling conditions, and to permit the operation of the engine at lower idling speeds than is possible without increasing the richness of the mixture.

The manual mixture control unit permits the operator, by manipulation of shaft 76, to open an extra jet 92, thereby increasing the richness of the mixture. This is used under high power output conditions, as at take-off, or when climbing. The jet 92 is designed to give a fuel-to-air ratio selected for maximum power output.

The enrichment valve 84 opens at high fuel pressure differentials in order to increase the richness of the mixture under high engine power output conditions. The purpose of the enrichment valve is to decrease the operating temperature of the engine by enriching the mixture, and to decrease any tendency toward detonation. Also, if the jet 92 is closed, it automatically changes the fuel-to-air ratio toward the value for maximum power output, when the power output exceeds a predetermined value.

Figure 4

Figure 4 illustrates a linkage for interconnecting the mixture control shaft 76 and the manual B. M. E. P. control lever 129 of Figure 1 with an ignition timing control rod 182.

It is desirable to advance the ignition timing, if possible, when operating with a lean mixture in order to secure maximum economy and efficiency. When the engine is operating at idling speeds, however, it is necessary to retard the ignition timing in order to prevent a condition wherein ignition occurs before the piston reaches its top dead center, known as pre-ignition. It is also necessary to retard the ignition under high B. M. E. P. conditions to avoid detonation. These conditions may be met by operating the controls to advance the ignition timing when the B. M. E. P. is in an intermediate range of values, and to retard the ignition timing under high pressure conditions and also under low pressure conditions, which correspond to idling conditions.

In the arrangement shown in Figure 4, the ignition timing control rod 182 is pivotally attached at its upper end to the center of a floating lever 184. The left end of lever 184 carries a pin 186 operating in a slot 188 in an arm 190 attached to the mixture control shaft 76. The construction is such that when the mixture control shaft is moved counterclockwise from its lean to its rich position the pin 186 is moved upwardly, thereby carrying the lever 182 upwardly and retarding the ignition timing. Similarly, when the shaft 76 is moved in a clockwise direction from its rich to its lean position, the pin 186 is moved downwardly, thereby carrying the rod 182 downwardly and advancing the ignition timing.

The right end of lever 184 is pivotally attached to the lower end of a link 192, whose upper end is attached to an intermediate point on the lever 129. When the manual B. M. E. P. control is set at its most efficient position, the arm 129 is in the position illustrated in the drawing, so that the arm 192 is at its lowest point, and hence the right end of lever 184 is likewise at its lowest point, and the ignition timing control rod 182 is in its most advanced position, as far as the B. M. E. P. control is concerned. The lever 129 is pivoted about its upper end, as it appears in Figure 4. When it is rotated in either direction from the position shown in Figure 4, the link 192 and the right end of lever 184 are moved upwardly, thereby moving the ignition timing control rod 182 in a direction to retard the ignition timing.

Figure 5

There is illustrated in this figure a modified form of the control linkage shown in Figure 4. In the arrangement shown in Figure 5, means are provided to selectively position the mixture control shaft 76 either automatically in accordance with the setting of the B. M. E. P. control or manually. In Figure 5, those elements which correspond to equivalent elements in Figure 4 have been given the same reference numerals, and those elements will not be additionally described.

The pin 188 at the left end of lever 184 moves in a slot 380 in an arm 382 which may be positioned by a knob 384. An arm 386 is attached to the mixture control shaft 76, and is provided with a slot 388. A pin 390, located at one end of a pair of toggle links 392 and 394, moves in a slot 388. The links 392 and 394 are pivoted together and to a connecting link 396. The opposite ends of the links 392 and 394 are connected by a spring 398. The right end of link 394 is fixed, and the left end of link 392 moves between a pair of stops 391 and 393.

When the knob 380 is in the position illustrated in the drawing, the mixture control shaft 76 is positioned by the movement of the B. M. E. P. control arm 129. As the right end of lever 184 moves upwardly, the connecting link 396 is moved upwardly until the toggle links 392 and 394 go over center, whereupon the spring 398 snaps the links to a position wherein link 392 engages stop 393, thereby moving the mixture control shaft 76 clockwise to its rich position. Similarly, when the shaft 76 is in its rich position and the right end of lever 184 is moved downwardly, the shaft 76 is moved to its lean position as soon as the toggle links go past the center position wherein they are aligned with the spring 398.

When the mixture control knob 384 is moved counterclockwise to the dotted position marked R in the drawing, the left end of lever 184 and the link 396 are moved upwardly until the toggle mechanism goes over center and moves the mixture control shaft 76 to the rich position. The various links are so proportioned that when the left end of lever 184 is so moved upwardly, the downward movement of the right end of lever 184 by the B. M. E. P. control mechanism cannot cause a movement of the shaft 76 to its lean position. Likewise, when the manual mixture control knob is moved to the dotted line position marked L in the drawing, the mixture control shaft 76 is moved to its lean position and the B. M. E. P. control cannot then move to its rich position.

It is desirable to have the fuel-to-air ratio lean when the ignition timing is advanced and to have the fuel-to-air ratio rich when the ignition timing is retarded. When the knob 384 is set in automatic position those conditions of operation are maintained. However, by manipulating the knob 384, the mixture control may be positively moved to its rich or lean positions regardless of the position of the B. M. E. P. control, if such operation is found to be desirable. When the mixture control is manually set, the ignition timing control is given a fixed adjustment in a corresponding direction, altho it is still varied with the setting of the B. M. E. P. control.

Altho my invention has been described as applied to a fuel supply system of the type in which the fuel is injected as a liquid directly into the cylinder head, it could be applied with equal facility to a system of the type in which the fuel and air are mixed before being drawn or forced into the engine. For example, the fluid motor 144 could be used in such an arrangement to position a suitable fuel flow controlling valve mechanism.

While I have shown and described certain preferred embodiments of my invention, other modifications thereof will readily occur to those skilled in the art, and I therefore intend my invention to be limited only by the appended claims.

I claim as my invention:

1. Control apparatus for an internal combustion engine, comprising ignition timing control means including a member movable between a first position corresponding to advanced ignition timing and a second position corresponding to retarded ignition timing, mixture control means including a member manually movable between a first position indicative of a rich fuel and air mixture and a second position indicative of a lean fuel and air mixture, a direct connection between said manually movable member and said ignition timing control member to move the latter positively toward said advanced position as said manually movable member moves to said lean position and to move said ignition timing control member positively toward said retarded position as said manually movable member is moved to said rich position, means for controlling the brake mean effective pressure of said engine including a manual control element, governor means for controlling the speed of said engine to maintain said speed at a selected value, selector means associated with said governor means for varying said selected value, said selector means being operable in all positions of said manual control element, means responsive to said selector means and to the position of said element for controlling the power output of said engine to maintain a value of brake mean effective pressure determined by the position of said element and unaffected by variations in said selected speed, and a connection between said control element and said ignition timing control member for operating said control member to advance the ignition timing when the brake mean effective pressure is in an intermediate range of values and to retard said ignition timing when said brake mean effective pressure has either a high or a low value.

2. Control apparatus as in claim 1, in which said connections between said manually movable member and said ignition timing control member and between said control element and said ignition timing control member comprise a floating lever, a pivotal connection between an intermediate point on said lever and said ignition timing control member, a pivotal connection between one end of said lever and said manually movable member, and a connection between the other end of said lever and said control element.

3. Control apparatus as in claim 2, in which said control element is a crank arm movable thru an angle corresponding to the range of said brake mean effective pressure, and said last-mentioned connection is a link connecting said arm and said other end of the lever and aligned with said arm when the latter is in an intermediate position.

4. Control apparatus for an internal combustion engine, comprising mixture control means including a member movable between a first position wherein said mixture control means establishes a lean fuel-to-air ratio and a second position wherein said mixture control means establishes a rich fuel-to-air ratio, a toggle mechanism connected to said member, means for driving said toggle including a floating lever and a link connected between said toggle and a point on said lever spaced from the center thereof, means for controlling the brake mean effective pressure of said engine, a connection between said brake mean effective pressure control means and the end of said lever farthest from said point, said brake mean effective pressure control means being capable of moving said farthest end over a limited range of movement, a manually movable control element, a connection between said element and the end of said lever nearest said point, said element and its associated connection being effective to move said nearest end between a first position wherein the range of movement of said farthest end is sufficient to operate said member thru said toggle and a second position wherein said range of movement is not sufficient to operate said member, ignition timing control means including a member movable between a first position corresponding to advanced ignition timing and a second position corresponding to retarded ignition timing, and a connection between said ignition timing control member and a central point on said lever.

LEIGHTON LEE, II.

REFERENCES CITED

The following references are of record in the file of this patent:

UNITED STATES PATENTS

| Number | Name | Date |
| --- | --- | --- |
| 1,483,883 | Hillhouse | Feb. 19, 1924 |
| 1,761,538 | Schwager | June 3, 1930 |
| 2,094,860 | Timian et al. | Oct. 5, 1937 |
| 2,217,364 | Halford et al. | Oct. 8, 1940 |